United States Patent [19]

Rüther et al.

[11] Patent Number: 5,999,805
[45] Date of Patent: Dec. 7, 1999

[54] PROCESS FOR MANAGING A NUMBER OF MOBILE STATIONS REGISTERED IN A BASE STATION OF A CORDLESS COMMUNICATION SYSTEM

[75] Inventors: Ralf Rüther, Coesfeld; Ulrich Bartsch, Bottrop; Josef Baumeister, Borken, all of Germany

[73] Assignee: Siemens Aktiengesellschaft, Munich, Germany

[21] Appl. No.: 08/963,232

[22] PCT Filed: Oct. 13, 1993

[86] PCT No.: PCT/DE93/00975

§ 371 Date: May 1, 1995

§ 102(e) Date: May 1, 1995

[87] PCT Pub. No.: WO94/10784

PCT Pub. Date: May 11, 1994

Related U.S. Application Data

[63] Continuation of application No. 08/428,143, May 1, 1995, abandoned.

[30] Foreign Application Priority Data

Oct. 30, 1992 [DE] Germany .............................. 42 36 777

[51] Int. Cl.⁶ ....................................................... H04Q 7/20
[52] U.S. Cl. .......................... 455/410; 455/426; 455/462; 455/411
[58] Field of Search ...................................... 455/410, 411, 455/422, 426, 432, 435, 462

[56] References Cited

U.S. PATENT DOCUMENTS

| | | | |
|---|---|---|---|
| 4,833,702 | 5/1989 | Shitara et al. | 379/60 |
| 5,020,094 | 5/1991 | Rash et al. | 379/62 |
| 5,335,262 | 8/1994 | Oguchi et al. | 379/58 |
| 5,335,278 | 8/1994 | Matchett et al. | 455/54.1 X |
| 5,438,608 | 8/1995 | Kojima | 379/58 |
| 5,517,554 | 5/1996 | Mitchell et al. | 455/410 |
| 5,629,975 | 5/1997 | Tiedemann, Jr. et al. | 379/60 |

FOREIGN PATENT DOCUMENTS

| | | |
|---|---|---|
| 63-299416 | 12/1988 | Japan . |
| 3-250823 | 11/1991 | Japan . |

*Primary Examiner*—Dwayne D. Bost
*Assistant Examiner*—Nay A. Maung
*Attorney, Agent, or Firm*—Hill & Simpson

[57] ABSTRACT

For mobile stations (MS1 . . . MSn) combined with a base station (BS1 . . . BSm), the loss of an unavailable mobile station (MS5) is signalled at the base station (BS1 . . . BSm) in that the relevant mobile station (MS5) is deleted from a memory (SP1) of the base station (BS1 . . . BSm) with respect to an identification word (IDW5).

11 Claims, 5 Drawing Sheets

| | |
|---|---|
| X0 | 00000 |
| X1 | 00000 |
| X2 | 00000 |
| X3 | 00000 |
| X4 | 00000 |
| X5 | 00000 |
| X6 | 00000 |
| X7 | IW 1 |
| X8 | 0000 \| X |
| X9 | 36 Bits \| X |

| | |
|---|---|
| X0 | IDW 1 |
| X1 | 00000 |
| X2 | 00000 |
| X3 | 00000 |
| X4 | 00000 |
| X5 | 00000 |
| X6 | 00000 |
| X7 | IW 1 |
| X8 | S-LW 1 \| X |
| X9 | 36 Bits \| X |

| | | |
|---|---|---|
| X0 | 00000 | |
| X1 | IDW 1 | TLW 1 |
| X2 | 00000 | |
| X3 | 00000 | |
| X4 | 00000 | |
| X5 | 00000 | |
| X6 | 00000 | |
| X7 | IW 1 | |
| X8 | S-LW 1 \| X | |
| X9 | 36 Bits \| X | |

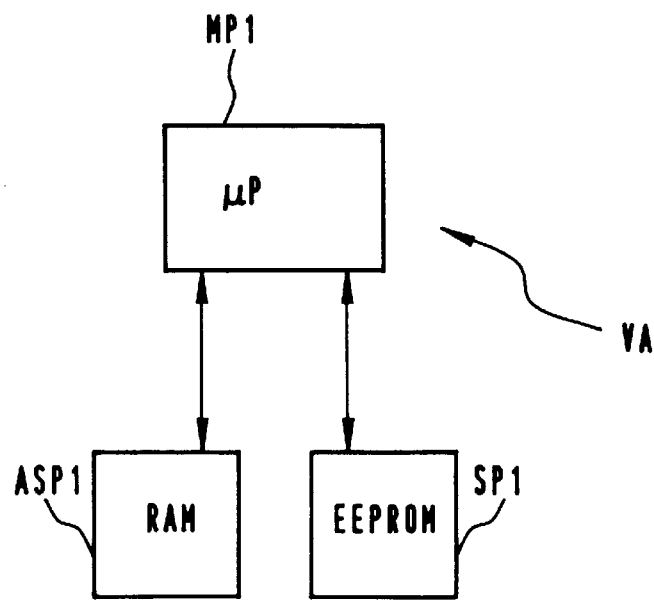

PROCESS FOR MANAGING A NUMBER OF MOBILE STATIONS REGISTERED IN A BASE STATION OF A CORDLESS COMMUNICATION SYSTEM

This is a continuation, of application Ser. No. 08/428,143, filed May 1, 1995, now abandoned.

BACKGROUND OF THE INVENTION

1. Field of the Invention

The invention relates to a process for managing a number of mobile stations registered in a base station of a cordless communication system, in which the mobile stations are registered in the base station on the basis of booking and registered procedures being executed between the base station and the mobile stations and including a mutual exchanging and storing of identification words.

2. Description of the Related Art

The technical development of communication systems for the cordless transmission of voice and non-voice information is tied to various standards, analogously to the ISDN standard (Integrated Services Digital Network) which has existed for some time in line-connected communications. Apart from some national standards and several cross-boundary standards such as the CT1, CT1+ standard on an analog basis and the CT2, CT3 standard on a digital basis, a standard, the so-called DECT standard (Digital European Cordless Telecommunication; compare Nachrichtentechnik Elektronik, Berlin, Vol. 42, No. 1, 1-2/1992, pages 23 to 29, U.Pilger: "Struktur des DECT-Standards" [Structure of the DECT standard]), analogous to the global GSM standard (Groupe Speciale Mobile or global systems for mobile communication; compare Informatik Spektrum, Springer Verlag Berlin, Vol. 14, No. 3, 1991, pages 137 to 152, A. Mann: "Der GSM-Standard—Grundlage für digitale europäische Mobilfunknetze" [The GSM standard—Basis for digital European mobile radio networks]) for mobile radio, has been created on a European scale for the lower-power cordless communication between portables and a base station, with ranges of some 100 meters. It is an essential feature of the DECT standard that the base station can be connected to line-connected communication networks (e.g. PSTN=Public Switched Telephone Network; PTN=Private Telecommunication Network).

For the cordless communication according to DECT standard, a dynamic channel selection of approximately 120 available channels is carried out.

The 120 channels result from the fact that in the DECT standard, ten frequency bands between 1.8 and 1.9 GHz are used, a time-division multiplex frame of 10 ms being used in time-division multiplex access (TDMA) in each frequency band according to the representation in FIG. 1. In this time-division multiplex frame, 24 time channels (from 0 to 23) are defined which provides a frame structure. This frame structure is then used in such a manner that for each frequency band, 12 stations of a DECT system can operate simultaneously in duplex mode. A time slot of in each case 417 $\mu$s is allocated to the 24 time channels. This time slot specifies the time in which information (data) are transmitted. This type of transmitting information in duplex mode is also called the ping-pong process because transmission takes place at a particular time and reception takes place at another time. In this ping-pong process, one time frame or pulse (burst) of 365 $\mu$s is transmitted in each time slot, which approximately corresponds to a frame length of 420 bits. The succession in time of the transmitted pulses defines a channel, the so-called physical channel, with a data throughput of 42 kbit/s for the time slot, 6 kbit/s for a guard space used in order to avoid overlaps by adjoining time slots, and 1.152 Mbit/s for the time-division multiplex frame. In the DECT standard, the time frame shown in FIG. 2 is allocated to a physical layer (PH-L) and is frequently also called the D field.

In addition, a number of layers are defined in the DECT standard, analogously to the ISDN standard with the ISO/OSI 7-layer model. One of these layers is the physical layer (PH-L). Another layer is a medium access control layer (MAC-L) which is allocated an A field and a B field according to FIG. 3. The A field comprises 64 bits which, inter alia, are used for messages when combining the portables and base station of the DECT communication system.

The B field comprises 324 bits, 320 bits of which are used for voice data and 4 bits for detecting partial interferences of the pulse.

In its simplest form, the DECT communication system has a base station with at least one mobile station. More complex (e.g. networked) systems contain several base stations having in each case several mobile stations. Due to the 24 time channels defined in the DECT standard, up to 12 mobile stations can be allocated to the base station, which communicate with the base station in duplex mode. For the time-division multiplex frame of 10 ms, also defined in the DECT standard, duplex mode means that information is transmitted every 5 ms from the base station to a mobile station or conversely. So that the base station and mobile station can communicate with one another, it must first be ensured that the two stations (communication partners) are combined to form one communicating unit.

For this combination, a booking and registration procedure is carried out according to European Patent document EP-A2-0 301 573. In this known booking and registration procedure, the combination between a base station and a mobile part is achieved as follows:

(1) Transmitting of a product-specific identification word from the base station to the mobile part which is ready for booking,
(2) Checking of the received identification word in the mobile part (determining the correspondence with an identification word stored in the mobile part and subsequent acknowledgement of the agreement found),
(3) Transmitting of a system- and telephone-specific identification code from the base station,
(4) Storing of the identification code in a memory of the mobile part. Another possible example of a booking and registration procedure will be described, with reference to FIGS. 4 to 12, in the text which follows.

FIG. 4 shows a flow chart of base stations BS1 . . . BSm and mobile stations MS1 . . . MSn of a cordless communication system for combining these to form a communicating unit. The base stations BS1 . . . BSm and mobile stations MS1 . . . MSn are transmitting/receiving devices which can both transmit and receive.

For combining the transmitting/receiving devices, it is first assumed at a booking stage that the base station BS1 . . . BSm and the mobile station MS1 . . . MSn are still in an OFF state. This OFF state is a sub-state of an INITIAL state ("RESET BS1 . . . BSm"), ("RESET MS1 . . . MSn") which is also associated with a COMMUNICATION state and a TRANSITION state (transition from a completed combining procedure to a new one).

To pass from the INITIAL state to a START state ("SET"), keys are operated independently of one another in time at the base station BS1 . . . BSm and the mobile station MS . . . MSn. In the case of the mobile station MS1 . . . MSn, this is usually a combination of keys whilst in the case of the base station BS1 . . . BSn, if (a) it is also constructed as a voice communication set or (b) as an interface to an external communication network, it can also be a combination of keys or a special key. Since m base stations and n mobile stations can be allocated to the communications system, there can as a consequence also be m and respectively n simultaneous or non-simultaneous switch-on processes. In FIG. 4, this is expressed by an "/" line in the "RESET/SET" transition.

In the text which follows, the combination of the base station BS1 and of the mobile station MS1 ("BS1×MS1" combination) of the m x n combinations for combining the base stations BS1 . . . BSm and mobile stations MS1 . . . MSn is to be described as representative of all others.

After the base station BS1 has been switched on ("SET" state), it is switched into a state of READINESS FOR BOOKING (RDY FOR BOOK") and a MESSAGE state ("MESS"), for example by operating the special key. In this MESSAGE state, the base station BS1 automatically transmits at least one message, by means of which it informs the mobile station MS1 of its readiness for booking, in each kth time-division multiplex frame of 10 ms for a period of, for example, less than 30 seconds. In the present exemplary embodiment, the base station BS1 transmits, for example, two messages, a DECT-specific message M1 and a supplementary message M2.

The DECT-specific message M1 is a message which is transmitted in the A field of the MAC layer (Medium Access Control Layer) in a Q channel defined there. In this Q channel, attributes of the base station BS1 are transmitted in a 16-bit information field for layers defined above the PH layer (Physical Layer) and the MAC layer (Medium Access Control Layer) of the DECT standard (DECT transmission agreement) (Higher Layer Information). The DECT-specific message transmitted by the base station BS1 is such an attribute. The message is transmitted whenever a logical "1" is set at position 13 of the information field.

The supplementary message M2 can be, for example, a user-specific message which can be used for identifying a group of equipment allocated to the base station BS1 as in the present exemplary embodiment. Since this exemplary embodiment is a DECT-specific communication system, the transmission frame necessary for transmitting the supplementary message M2 within the time frame defined in the DECT standard must also be available for this.

In the DECT standard, it is possible to transmit various system information items in the A field of the MAC layer (Medium Access Control Layer) in a Q channel defined there. This range of transmittable system information items, in turn, contains a transmission sequence (ESCAPE sequence) to which no DECT-specific information content is allocated and which is therefore freely available. This ESCAPE sequence, which is initiated by an initiating sequence (HEADER) of 4 bits with the bit combination of "0111", comprises a total of 36 freely available bits. According to the DECT transmission convention, the supplementary message M2 and the DECT-specific message M1 are transmitted alternating with another DECT message in every 8th of 16 (k=16) time-division multiplex frames.

To be able to receive the two messages Ml, M2 transmitted by the base station BS1 in the MESSAGE state ("MESS"), the mobile station MS1 must be in a state of READINESS FOR SIGNAL ("RDY FOR SIGN"). The mobile station MS1 is switched from the SET state to the state of READINESS FOR SIGNAL by means of the aforementioned key combination.

If the mobile station MS1 is in this state and the two messages M1, M2 are transmitted by the base station BS1 during this state, the mobile station MS1 attempts to synchronize to these two messages M1, M2 in a SYNCHRONIZATION state ("SYNC"). Synchronization by the mobile station MS1 is not required, depending on the time of the message transmitted by the base station BS1. In the present exemplary embodiment, this applies to the DECT-specific message M1. This message is a type of message which is "easy to handle", in which any mobile station automatically receives an authorization for access to the base station BS1. As already mentioned in the introduction to the description, however, this is not desirable. The mobile station MS1, which only attempts to obtain the access of authorization on the basis of the DECT-specific message M1 received in a state of END OF SYNCHRONIZATION ("RDY SYNC; Ml"), is rejected by the base station BS1 because the latter is not in a state of READINESS FOR RECEPTION ("TO BE RECE"). The mobile station MS1 thus has no other option but to synchronize the supplementary message M2, also transmitted by the base station BS1.

In distinction from the DECT-specific message M1, the supplementary message M2 is a user-individual message type in order to impede the access authorization for the base station BS1. It should be pointed out again at this point that it is also possible to transmit more than one supplementary message M2 (e.g. Mi, where i=3 . . . j), in order to further impede the access authorization. A limit for such extensions is set, however, by the 36 bits of the ESCAPE sequence, at least with respect to the DECT standard.

The mobile station MS1 synchronizes to the supplementary message M2 by the mobile station MS1 searching for a synchronization information item corresponding to this supplementary message M2 in a SEARCH state ("SRCH IN MEMO") in a memory allocated to it (e.g. a RAM or ROM etc.). If this search of the mobile station MS1 remains unsuccessful in a FIND state ("FIND"), the user of the mobile station MS1 cannot obtain the access authorization for the base station BS1. He will be rejected as unauthorized. This means that he can safely switch off the mobile station MS1 ("RESET MS1. . . MSn") temporarily in order to attempt, for example at a different time, to combine with one of the other base stations BS2 . . . BSm.

If, however, this search of the mobile station MS1 is successful in the FIND state ("FIND"), synchronization is completed, provided no other supplementary messages Mi have been sent by the base station BS1 ("RDY SYNC; M1^M2"). In this "RDY SYNC; M1 A M2" state, the mobile station MS1 receives, for example from the base station BS1, an individual BS1 identification word IW1 (IWm) which is permanently allocated to the base station BS1 during its manufacture and is undecodably stored in a programmable BS1 memory (BS1 storage location X7 of the BS1 memory SP1 according to FIGS. 5 to 7 and 11) of the base station. The BS1 identification word IW1 (IWm) received is temporarily stored in a main memory (MS1 main memory ASP2.1 according to FIG. 9) in the mobile station MS1.

The mobile station MS1 thereupon automatically transmits a return message RM to the base station BS1 in an ANSWER state ("ANSW"). With this return message RM, an individual MS1 identification word IDW1 (IDWn) which is permanently allocated to the mobile station MS1 during its manufacture and is undecodably stored in a programmable MS1 memory (MS1 storage location Y0 of the MS1 memory SP2.1 according to FIGS. 8 to 10) of the mobile station MS1 is also transmitted via the mobile station MS1 and temporarily stored in a buffer (BS1 memory location X0 of the BS1 memory SP1 according to FIG. 6) in the base station BS1. After that, the mobile station MS1 automatically changes to a REGISTRATION state ("REGI"). This change concludes the request stage and the mobile station MS1 signals to the base station BS1 that a registration stage can now begin (declaration of readiness for registration).

The base station BS1, which is already in a first RECEIVE state ("RECE-1") after the transmission of the last message and is waiting for this return message RM (feedback from a mobile station), immediately thereafter engages the mobile station MS1, which is in the REGISTRATION state ("REGI"), for the registration stage in an ENGAGE state ("ENGA") by means of a "clamp".

With the "clamping" of the mobile station MS1, the base station BS1 switches itself off (dot-dashed arrow in FIG. 4 from the ENGAGE state ("IENGA") to the INITIAL state ("RESET BS1 . . . BSm")) with respect to the readiness for booking ("SET"; "RDY FOR BOOK"; "MESS"states). This prevents the other mobile stations MS2 . . . MSn from obtaining the access authorization, for the base station BS1 during the booking stage, for the registration stage in which the mobile station MS1 is combined with the base station BS1. As soon as the registration phase has elapsed for the mobile station MS1 and the base station BSm, the mobile stations MS2 . . . MSn again have the opportunity to gain the access authorization for the base station BS1 in the request stage.

The case described above, in which the mobile stations cannot obtain access authorization for a base station during a registration stage in progress occurs, in particular, when a number of mobile stations wish to obtain the access authorization in the period between the transmission of at least one message ("MESS") state and the initial reception of a return message by the base station. In the present exemplary embodiment, this problem is solved in accordance with the principle "first sender of a return message is first".

As an alternative, however, there is also the possibility that all mobile stations registered during this specific period are progressively processed (a) in parallel by the base station or (b) remaining in a waiting loop, retaining the principle.

With the "clamping" of the mobile station MS1 by the base station BS1, the base station BS1 automatically returns to a second RECEIVE state ("RECE-2") in which it waits for a legitimation message LM from the mobile station MS1. The mobile station MS1 transmits this legitimation message LM immediately after it has been "clamped" by the base station BS1, in a LEGITIMATION state ("LEGI"), to the base station BS1. The legitimation message LM consists of a coded actual legitimation word I-LW which is generated by the user of the mobile station MS1 by pressing keys at the user interface of the mobile station MS1. The base station BS1, which has already waited for this legitimation message LM, checks in an AUTHORIZED state ("AUTH") whether the actual legitimation word I-LW received by it, with which the mobile station MS1 alleges to be authorized for registration in the base station BS1, is identical with a nominal legitimation word S-LW which is stored in a programmable BS1 memory (e.g. PROM, EPROM or EEPROM etc.) allocated to the base station BS1. This nominal/actual comparison can be carried out by means of a program in the base station BS1 or by means of a comparing arrangement implemented in the base station BS1, in which the comparing arrangement VA, according to FIG. 12, in its simplest form consists of a BS1 microprocessor as a comparator, a BS1 main memory allocated to the BS1 microprocessor (e.g. RAM) for storing the actual legitimation word I-LW, and the programmable BS1 memory, also allocated to the BS1 microprocessor, with the nominal legitimation word S-LW stored therein.

If the base station BS1 finds in the AUTHORIZED STATE ("AUTH") that the actual legitimation word I-LW does not correspond to the nominal legitimation word S-LW (I-LW≠S-LW), and thus the mobile station MS1 is not authorized for registration or the user of the mobile station MS1 is not authorized, it rejects the mobile station MS1 which, in the meantime, is in a CORRECT state ("CORR"), as unauthorized. The base station BS1 thereupon eliminates itself for registration by returning to the INITIAL state ("RESET BS1 . . . BSm").

In correspondence therewith, the user of the mobile station MS1 can temporarily switch off the mobile station MS1 ("RESET MS1 . . . MSn") after it has been rejected for registration by the base station BS1, in order to attempt then, for example at a different time, to combine with another base station.

If, however, the mobile station MS1 is authorized for the registration (I-LW=S-LW), the base station BS1 and the mobile station MS1 in each case change to a JOINED state ("JOIN"). In this state, the identification words IW1, IDW1, which have in each case been temporarily stored, are "permanently" stored as conclusion of the combining procedure (the BS1 identification word IW1 is stored at the MS1 storage location Y1 of the MS1 memory SP2.1 by the main memory ASP2.1 in the mobile station MS1 according to FIGS. 9 and 10 and the MS1 identification word IDW1 is stored at the BS1 storage location Xl by the BS1 storage location X0 in the base station BS1 according to FIGS. 6 and 7).

With this mutual storage of the identification words, the base station BS1 and mobile station MS1 have been combined to form the communicating unit. After this combining, the base station BS1 and mobile station MS1 are in each case reset to the initial state ("RESET BS1 . . . BSm") and, respectively, ("RESET MS1 . . . MSn") for any possible new combinations. In this INITIAL state, the base station BS1 and the mobile station MS1 can start a new combining procedure, in each case in the TRANSITION state, in which the base station BS1 is to be combined, for example, with the mobile stations MS1 . . . MSn and the mobile station MS1 is to be combined with the base stations BS2 . . . BSm, or can change into the COMUNICATION state for setting up a communication link.

FIGS. 5 to 10 show various memory states of the BS1 memory SP1 of the base station BS1 and the MS1 . . . MS6 memories SP2.1 . . . SP2.6 of the mobile stations MS1 . . . MS6 during the combining procedure of the base station BS1 with the six mobile stations MS1 . . . MS6.

The BS1 memory SP1 has, for example, ten BS1 storage locations X0 . . . X9 which are used as follows:

The BS1 storage location X0 is reserved, for example, as buffer location for the MS1. . . MS6 identification words IDW1 . . . IDW6 of the mobile stations MS1 . . . MS6.

The BS1 storage locations X1 . . . X6 are reserved, for example, as read-only memory locations for the MS1 . . . MS6 identification words IDW1 . . . IDW6 of the mobile stations MS1 . . . MS6 (subscribers TLN1 . . . TLN6).

The BSI storage location X7 is reserved, for example, as read-only memory location for the BS1 identification word IW1.

The BS1 storage location X8 is reserved, for example, as read-only memory location for the nominal legitimation word S-LW1.

The BS1 storage location X9 is reserved, for example, as read-only memory location for the 36 bits of the supplementary message.

The MS1 ... MS6 memories SP2.1 ... SP2.6 have, for example, in each case two MS1 ... MS6 storage locations Y0, Y1 which are used as follows:

The MS1 ... MS6 storage locations Y0 are reserved, for example, as read-only memory locations, in each case for the MS1 ... MS6 identification words IDW1 .IDW6 of the mobile stations MS1 ... MS6.

The MS1 ... MS6 storage locations Y1 are reserved, for example, as read-only memory locations in each case for the BS1 identification word IW1.

In addition, the mobile stations MS1 ... MS6 have MS1 .MS6 main memories ASP2.1 ... ASP2.6 which are available as buffer locations for the BS1 identification word IW1.

In detail:

FIG. 5 shows the BS1 memory state of the BS1 memory SP1 after the base station BS1 has left production.

FIG. 8 shows the MS1 ... MS6 memory states of the MS1 ... MS6 memories SP2.1 ... SP2.6 after the mobile stations MS1 .MS6 have left production.

FIG. 6 shows the BS1 memory state of the BS1 memory SP1 when the base station BS1 is in the first RECEIVE state ("RECE-1").

FIG. 9 shows the MS1 ... MS6 memory states of the MS1 . MS6 memories SP2.1 ... SP2.6, after the mobile stations MS1 ... MS6 have synchronized in the END OF SYNCHRONIZATION state ("RDY SYNC; M1^M2").

FIG. 7 shows the BS1 memory state of the BS1 memory SP1 after the base station BS1 has combined with the mobile station MS1.

FIG. 10 shows the MS1 ... MS6 memory states of the MS1 .MS6 memories SP2.1 ... SP2.6 after the base station BS1 has combined with the mobile station MS1.

FIG. 11 shows the BS1 memory state of the BS1 memory SP1 after the base station BS1 has combined with the mobile stations MS1 ... MS6. The MS1 ... MS6 memory states of the MS1 ... MS6 memories SP2.1 ... SP2.6 remain unchanged compared with the states in FIG. 10.

If the combination has been carried out and concluded, for example in the manner described above, the case may occur that at least one of these mobile stations allocated to the base station is no longer available (for example due to theft or loss). So that it is not possible, for example in the case of a stolen mobile station, to access the base station with the aid of this mobile station, for example in order to conduct telephone conversations via this base station (if this is connected to external communication networks) (misuse), the base station must be informed of the unavailability.

SUMMARY OF THE INVENTION

It is an object of the invention to provide a process for managing a number of mobile stations registered in a base station of a cordless communication system, in which the unavailability (for example due to loss or theft) of mobile stations is reported to the base station in order to take this circumstance into consideration when setting up other communication connections between the base station and this mobile station which is no longer available.

This object is achieved by the features specified in the characterizing clause of Patent claim 1 on the basis of the process defined in the preamble of Patent claim 1. This and other objects and advantages of the invention are provided by control procedures by means of which a cancellation of the registration of at least one unavailable mobile station is initiated (a deaffiliation procedure), can be carried out on a user interface of a station which can be arranged in the cordless communication system.

Advantageous further developments of the invention are provided in the process as described above further characterized in that the registration of the unavailable mobile station is cancelled by deleting a mobile-station-specific identification word, stored in the base station, of the unavailable mobile station. The process provides, as a further improvement, that the registration of the unavailable mobile station is cancelled by deleting all mobile-station-specific identification words stored in the base station and again executing the booking and registration procedures necessary for the registration in the base station for the available mobile stations.

BRIEF DESCRIPTION OF THE DRAWINGS

An exemplary embodiment of the invention is explained with reference to FIG. 13.

DETAILED DESCRIPTION OF THE PREFERRED EMBODIMENTS

Figure 1:
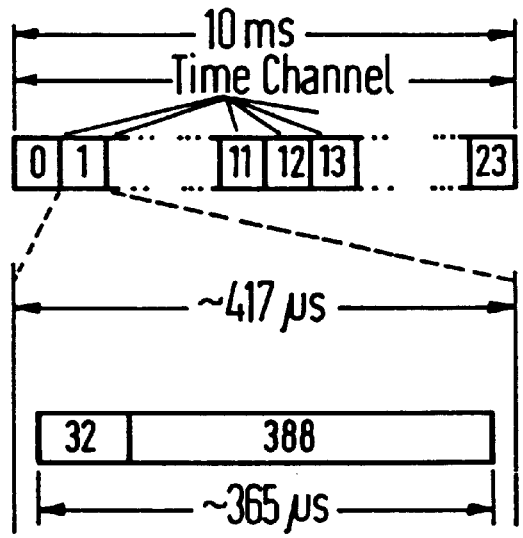
Figure 2:
Figure 3:
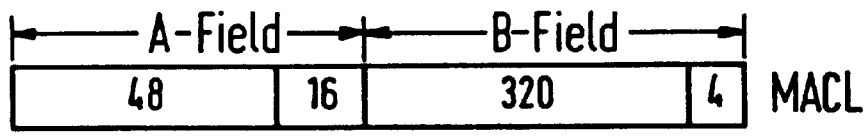
Figure 4:
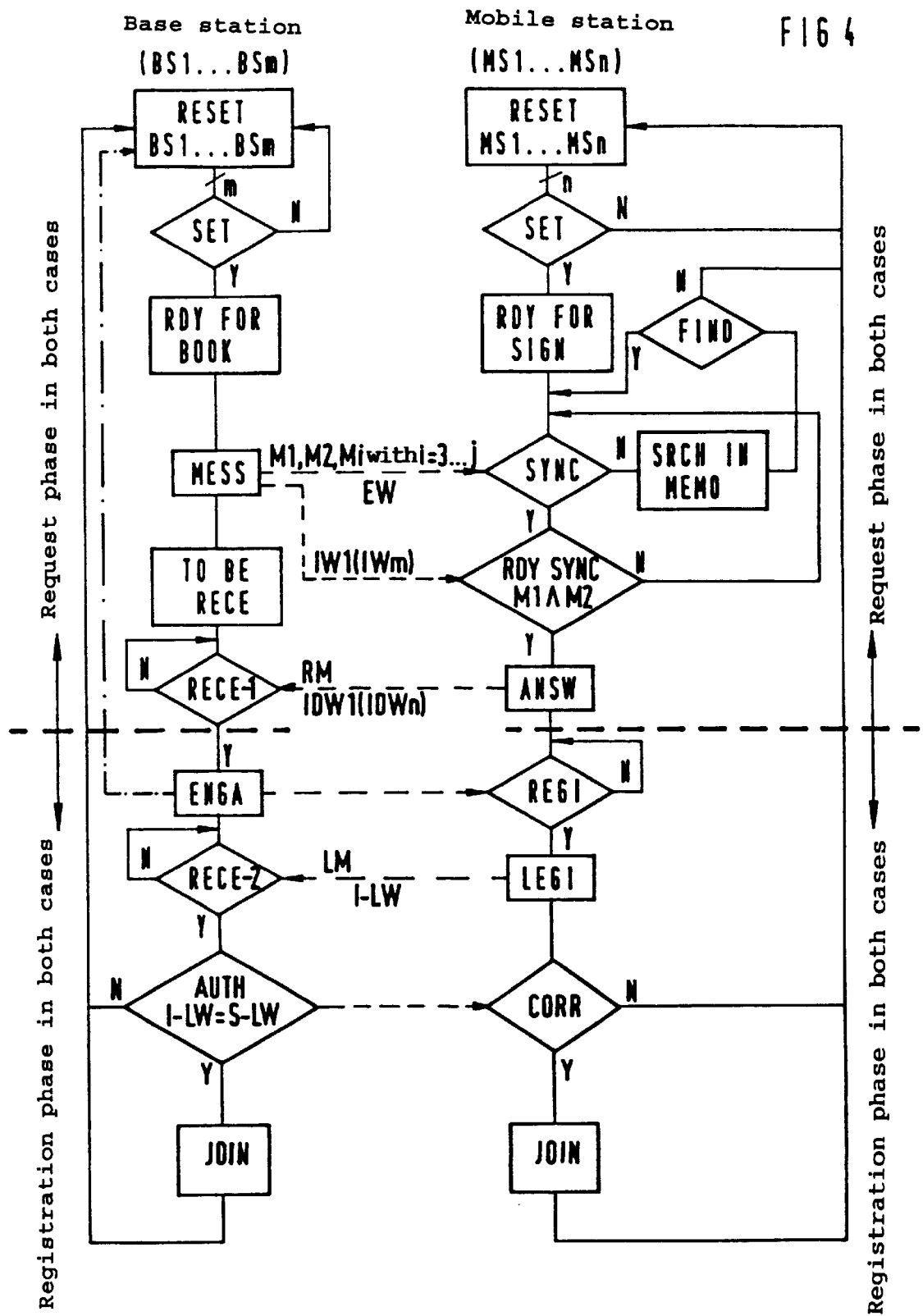
Figure 8:
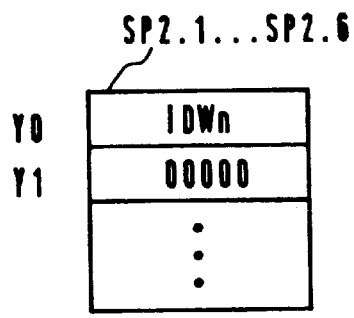
Figure 8:
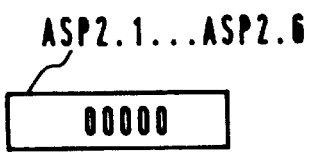
Figure 9:
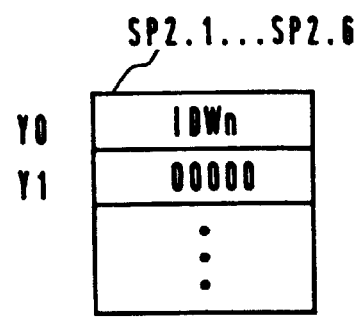
Figure 9:
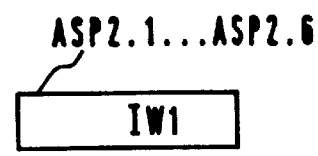
Figure 10:
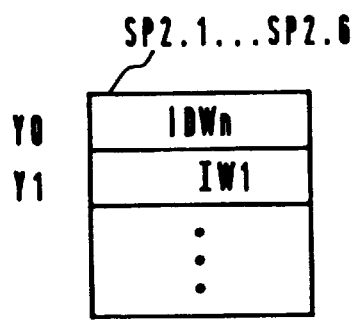
Figure 10:
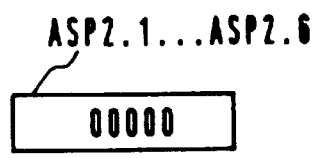

FIG. 13 shows the memory state SP1 of the base station BS1 after the unavailable mobile station MSS of the mobile stations MS1 ... MS6 according to FIG. 11 combined with the base station BS1 is no longer registered in the base station BS1. For this purpose, the user of the base station BS1 carries out a deaffiliation procedure.

For this deaffiliation procedure, all mobile stations MS1 ... MS6 registered in the base station BS1 or combined with it are first assembled. The user of the base station BS1 can determine the mobile station which is no longer available, in the present case mobile station MS5, on the basis of the subscriber numbers TLN1 ... TLN6 allocated to each of these mobile stations MS1 ... MS6, by means of which subscriber numbers the mobile stations MS1 ... MS6 are managed in the base station BS1. The determination is carried out by displaying for each mobile station which is still available the subscriber number under which it is carried in the base station BS1 on a display allocated to the mobile stations MS1 ... MS6. This will show that the mobile station MS5 is no longer available. When the unavailable mobile station MS5 has been determined, its identification word IDW5 stored in the memory SP1 of the base station BS1 is deleted. This deleting is carried out by a special key procedure on one of the mobile stations MS1 ... MS4, MS6.

To inform the base station BS1 of the identification word which is to be deleted during this procedure, the memory location of the memory SP1 in which the word to be deleted is stored must be specified. For this purpose, the base station BS1 is informed of the corresponding subscriber number TLN5 as address. On the basis of this message, the identification word IDW5 of the mobile station MS5 is then deleted from the memory SP1. This means that the storage location X5 is again available for a new mobile station MS7 ... MSn which wishes to be combined with the base station BS1. The mobile station MS5 is thus no longer combined with the base station BS1, so that the user of the mobile station MSS can no longer set up a communication link to the base station BS1.

A possibility of deaffiliating an unavailable mobile station consists in the user of the base station BS1 deleting all registered identification words IDW1 ... IDW6 and then, for example, again carrying out the request and registration procedure described initially for the mobile stations MS1 ... MS4, MS6 still present.

Although other modifications and changes may be suggested by those skilled in the art, it is the intention of the inventors to embody within the patent warranted hereon all changes and modifications as reasonably and properly come within the scope of their contribution to the art. subscriber number under which it is carried in the base station BS1 on a display allocated to the mobile stations MS1 ... MS6. This will show that the mobile station MS5 is no longer available. When the unavailable mobile station MS5 has been determined, its identification word IDW5 stored in the memory SP1 of the base station BS1 is deleted. This deleting is carried out by a special key procedure on one of the mobile stations MS1 . . . MS4, MS6.

To inform the base station BS1 of the identification word which is to be deleted during this procedure, the memory location of the memory SP1 in which the word to be deleted is stored must be specified. For this purpose, the base station BS1 is informed of the corresponding subscriber number TLNS as address. On the basis of this message, the identification word IDW5 of the mobile station MS5 is then deleted from the memory SP1. This means that the storage location X5 is again available for a new mobile station MS7 . . . MSn which wishes to be combined with the base station BS1. The mobile station MS5 is thus no longer combined with the base station BS1, so that the user of the mobile station MS5 can no longer set up a communication link to the base station BS1.

A possibility of deaffiliating an unavailable mobile station consists in the user of the base station BS1 deleting all registered identification words IDW1 .IDW6 and then, for example, again carrying out the request and registration procedure described initially for the mobile stations MS1 . . . MS4, MS6 still present.

We claim:

1. A process for managing a number of mobile stations registered in at least one base station of a cordless communication system, in which the mobile stations are registered in the base station on the basis of booking and registration procedures being executed between the base station and the mobile stations and including a mutual exchanging and storing of identification words, comprising the steps of:

displaying information for each mobile station that is still available to determine which previously available registered mobile stations are now missing; and initiating control procedures which result in a cancellation of the previously available registration of at least one missing mobile station, said control procedures being carried out on a user interface of the cordless communication system.

2. A process for managing a plurality of mobile stations and at least one base station of a cordless communication system, comprising the steps of:

registering the mobile stations in the base station by executing booking and registration procedures between the base station and the mobile stations and including a mutual exchanging and storing of identification words, displaying registration information for all available registered mobile stations to determine which registered mobile station is missing, and selectively canceling registration of a mobile station which has been determined to be missing to provide deaffiliation of said missing mobile station from said base station.

3. A process for managing a number of mobile stations registered in at least one base station of a cordless communication system, in which the mobile stations are registered in the base station on the basis of booking and registration procedures being executed between the base station and the mobile stations and including a mutual exchanging and storing of identification words, comprising the steps of:

initiating control procedures which result in a cancellation of the previously available registration of at least one missing mobile station, said control procedures being carried out on a user interface of the cordless communication system, said control procedures including:

deaffiliating all registered mobile stations from said base station, and reregistering all of said mobile stations which are available so that any missing mobile stations remain unregistered.

4. A process for managing a number of mobile stations registered in at least one base station of a cordless communication system, in which the mobile stations are registered in the base station on the basis of booking and registration procedures being executed between the base station and the mobile stations and including a mutual exchanging and storing of identification words, comprising the step of:

initiating control procedures which result in a cancellation of the previously available registration of at least one missing mobile station, said control procedures being carried out on a user interface of a station which is remote from the at least one base station and available in the cordless communication system.

5. A process as claimed in claim 4, further comprising the step of:

canceling the registration of the missing mobile station by deleting a mobile-station-specific identification word, stored in a memory in the base station, of the missing mobile station.

6. A process as claimed in claim 4, further comprising the step of:

canceling the registration of the missing mobile station by deleting all mobile-station-specific identification words stored in memory in the base station to free memory locations, and again executing the booking and registration procedures necessary for the registration in the base station for the available mobile stations including storing identification words for the available mobile stations in the memory locations freed in said canceling step.

7. A process as claimed in claim 4, wherein said missing mobile phone is missing as a result of being lost or stolen.

8. A process as claimed in claim 1, wherein said missing mobile phone is missing as a result of being lost or stolen.

9. A process for managing a plurality of mobile stations and at least one base station of a cordless communication system, comprising the steps of:

registering the mobile stations in the base station by executing booking and registration procedures between the base station and the mobile stations and including a mutual exchanging and storing of identification words, and selectively canceling registration of a selected mobile station after said selected mobile station becomes missing, said canceling being carried out on a user interface of a station which is available and remote from the base station in the cordless communication system to provide deaffiliation of said selected mobile station from said base station.

10. A process as claimed in claim 9, wherein said canceling step includes deleting an identification word from a memory of said base station, said identification word corresponding to said selected mobile station.

11. A process as claimed in claim 10, wherein said substep of deleting the identification word from the memory deletes the memory word from a selected memory location, and further comprising the step of:

making said selected memory location available for receiving an identification word of an additional mobile station after said substep of deleting.

* * * * *